United States Patent
Griggs et al.

(10) Patent No.: US 7,139,118 B2
(45) Date of Patent: Nov. 21, 2006

(54) OPTICAL AMPLIFIERS

(75) Inventors: Roger David Griggs, Devon (GB);
Clive John Palmer, Devon (GB);
Andrew John Parker, Devon (GB);
Timothy Andrew Semmens, Devon (GB)

(73) Assignee: Bookham Technology plc, Towchester (GB)

( * ) Notice: Subject to any disclaimer, the term of this patent is extended or adjusted under 35 U.S.C. 154(b) by 59 days.

(21) Appl. No.: 11/146,709

(22) Filed: Jun. 7, 2005

(65) Prior Publication Data
US 2006/0077534 A1    Apr. 13, 2006

(30) Foreign Application Priority Data
Jun. 10, 2004   (GB) .................................. 0413017.5

(51) Int. Cl.
*H01S 3/00* (2006.01)
(52) U.S. Cl. .................................. 359/337.1; 359/337.4
(58) Field of Classification Search ............. 359/337.1, 359/337.4
See application file for complete search history.

(56) References Cited

U.S. PATENT DOCUMENTS

| | | | |
|---|---|---|---|
| 5,600,481 A | 2/1997 | Nakabayashi | |
| 6,008,935 A | 12/1999 | Fujita et al. | |
| 6,151,159 A | 11/2000 | Michishita | |
| 6,215,584 B1 | 4/2001 | Yang et al. | |
| 6,337,764 B1 | 1/2002 | Yoon et al. | |
| 6,525,873 B1 | 2/2003 | Gerrish et al. | |
| 6,603,596 B1* | 8/2003 | Inagaki et al. | 359/341.4 |
| 6,606,191 B1 | 8/2003 | Gerrish et al. | |
| 6,865,016 B1* | 3/2005 | Sugaya et al. | 359/337.1 |
| 2002/0039226 A1 | 4/2002 | Murakami et al. | |
| 2002/0159135 A1 | 10/2002 | Kelkar et al. | |
| 2003/0147126 A1 | 8/2003 | Rapp | |

OTHER PUBLICATIONS

U.K. Search Report for corresponding Application No. 0413017.5 dated Nov. 11, 2004.

* cited by examiner

*Primary Examiner*—Mark Hellner
(74) *Attorney, Agent, or Firm*—Renner, Otto, Boisselle & Sklar, LLP

(57) ABSTRACT

A multistage optical amplifier is controlled to compensate for the effect of amplified spontaneous emission (ASE) by a method comprising the following steps. Optical input and output signals to a first gain stage are detected, and the drive current to the first gain stage is controlled in dependence on the optical input signal to the first gain stage. Optical input and output signals to a last gain stage are detected, and the drive current to the last gain stage is controlled to maintain the output power of the last gain stage substantially constant. The effect of ASE in the first gain stage is compensated for by applying a correction factor based on the ASE of the first gain stage and the output power of the first gain stage. The drive current supplied to the first gain stage is controlled to zero in on an error signal of the general form:

(Total Power at $B$–Stage 1 $ASE$)–($A$+Stage 1 Gain)

where Total Power at B is the power of the output signal from the first gain stage, and A is the input signal of the first gain stage. Furthermore the drive current supplied to the last gain stage is controlled to zero in on an error signal of the general form:

(Total Power at $E$–Stage 2 $ASE$)–($D$+Stage 2 Gain)

where Total Power at E is the power of the output signal from the last gain stage, and D is the input signal of the last gain stage. In this method the correction factor is calibrated in the gain control mode and is subsequently applied in the power control mode, and this therefore simplifies the calibration procedure.

24 Claims, 3 Drawing Sheets

OPTICAL AMPLIFIERS

BACKGROUND OF THE INVENTION

This invention relates to optical amplifiers and is concerned more particularly, but not exclusively, with multiple stage erbium doped fibre amplifiers (EDFAs).

The performance of optical amplifiers can be characterised by two main performance parameters, namely the noise figure (NF) and the Gain Ripple (GR). In an inverted erbium doped fibre amplifier (EDFA) the signal is amplified by stimulated emission with a noise component generated as a result of spontaneous emission. This spontaneous emission can be further amplified by the amplifier, resulting in amplified spontaneous emission (ASE). ASE is thus generated over the entire gain bandwidth region of the amplifier. In conventional EDFAs the gain and or power of the amplifier is controlled using total power monitoring schemes that cannot not differentiate between signal and ASE components. The noise figure and gain ripple are thus impacted by the effectiveness of the control scheme and its account of ASE.

U.S. Pat. No. 6,606,191 discloses a method for controlling the performance of an optical amplifier in order to compensate for ASE in a gain control mode. In this method values are obtained for the input and output power electronic circuitry DC offset, and set point values are selected as follows: power set point=_0.0, gain set point=_desired gain. A digital value representative of the signal input value is then obtained and the input electronic circuitry DC offset subtracted to produce an adjusted input power value, and a digital value representative of the signal output value is obtained and the output power electronic circuitry DC offset subtracted to produce an adjusted output power value. The ASE content of the adjusted input power value is obtained either utilising a look-up table or a formula, and the ASE content is subtracted from the adjusted input power value to produce an ASE adjusted output power value. The gain set point is multiplied by the ASE adjusted input power value and subtracted from the ASE adjusted output power value, or alternatively the ASE adjusted output power value is divided by the gain set point and the adjusted input power value is subtracted from this to obtain the gain control error signal. The gain control error signal is then subtracted from any number to produce a controller input signal, and the controller input signal is transformed into digital representation of at least one pump control signal by a control algorithm. The digital representation is transformed into at least one corresponding analogue pump control signal that is applied to at least one pump by way of driver circuitry.

Although the input power is adjusted for its overall ASE content in such an arrangement, there is no mention of making adjustments for the ASE content arising in the gain stage doing the work. Accordingly the ASE is amplified along with the signal and without taking into account ASE from the current stage. In a multistage amplifier the ASE compensation of any stage after the first gain stage must account for both the ASE arising from the preceding stages as well as the ASE arising from that gain stage. It follows that the amplifier cannot be switched to the power control mode using ASE factors determined from calibration in the gain control mode, so that, in this case, specific calibration of ASE factors for the power control mode would be required.

Furthermore U.S. Pat. No. 6,525,873 discloses an optical fibre amplifier comprising at least one optical pump source coupled to an optical gain medium, an input optical signal tap coupled to a first optical detector, an output optical signal tap coupled to a second optical detector, and an electronic controller receiving inputs from the detectors to control the optical power provided by the pump source. The controller includes a programmed unit and a user interface allowing the user to choose between available control functions including ASE noise compensation. Although this reference does not specify how ASE calibration is effected, it seems likely that such ASE compensation requires separate calibration in the gain control mode and in the output power control mode.

It is an object of the invention to provide an optical amplifier which enables ASE compensation to be effected in a particularly straightforward manner.

SUMMARY OF THE INVENTION

According to the present invention there is provided an optical amplifier having a plurality of controllable gain stages separated by loss means and including first and last gain stages, the amplifier comprising:

(i) gain control means for controlling the drive current supplied to the first gain stage in dependence on the optical input signal to the first gain stage, (ii) power control means for controlling the drive current supplied to the last gain stage to maintain the output power of the last gain stage substantially constant, and (iii) compensating means for compensating the gain control means for the effect of amplified spontaneous emission (ASE) in the first gain stage, the compensating means applying a correction factor based on the ASE outputted by the first gain stage and the output power of the first gain stage.

Such an arrangement is adapted to provide ASE compensation in the output power control mode in a multi-stage amplifier whilst maintaining a simple ASE calibration process involving calibration in the gain control mode only without having to take account of output power control mode specific calibration factors. By taking account of the ASE of preceding stages in the final stage ASE compensation, this allows output and gain alarm handling to operate directly from detected readings without lengthy logarithmic and exponential calculations. Thus good noise performance can be achieved over a large range of input signals, and a single optical amplifier can be used in different control modes and applications without the need for additional calibration. Typically the manufacturer of the optical amplifier performs the necessary calibration in the gain control mode. The user can then switch to the output power control mode for normal use and utilise the gain control mode ASE calibration settings.

Preferably the gain control means includes input detection means for detecting an optical input signal to the first gain stage, and output detection means for detecting an optical output signal from the first gain stage. In each case the detection means may incorporate a tap-off coupler for tapping off a proportion of the optical signal and a photodetector for supplying an electrical detection signal indicative of the detected optical signal.

Furthermore the power control means preferably includes input detection means for detecting an optical input signal to the last gain stage, as well as output detection means for detecting an optical output signal from the last gain stage. Again the detection means may incorporate a tap-off coupler and a photodetector for supplying the required electrical detection signal.

Conveniently variable attenuation means are provided between the first and second gain stages for setting the required overall internal gain of the amplifier.

In a preferred embodiment the gain stages comprise loops of an erbium-doped fibre. However, in other embodiments, each gain stage is constituted by an SOA, an Ytterbium fibre or some other suitable component.

The invention also provides method of controlling an optical amplifier having a plurality of gain stages in order to compensate for the effect of amplified spontaneous emission (ASE), the method comprising:

(i) detecting an optical input signal to a first gain stage, (ii) detecting an optical output signal from the first gain stage, (iii) controlling the drive current supplied to the first gain stage in dependence on the optical input signal to the first gain stage, (iv) detecting an optical input signal to a last gain stage, (v) detecting an optical output signal from the last gain stage, (vi) controlling the drive current supplied to the last gain stage to maintain the output power of the last gain stage substantially constant, and (vii) compensating for the effect of amplified spontaneous emission (ASE) in the first gain stage by applying a correction factor based on the ASE of the first gain stage and the output power of the first gain stage based on the ASE of the first pump stage and the output power of the first pump stage.

BRIEF DESCRIPTION OF THE DRAWINGS

In order that the invention may be more fully understood, reference will now be made, by way of example, to the accompanying drawings, in which.

DETAILED DESCRIPTION OF THE DRAWINGS

Figure 1:
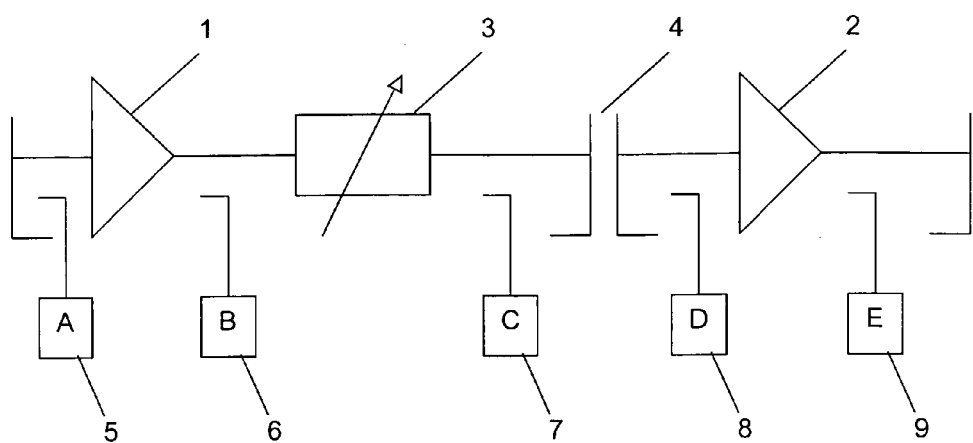
FIG. 1 is a schematic diagram of a two-stage optical fibre amplifier in accordance with the invention.

FIG. 1 diagrammatically illustrates an erbium doped fibre (EDF) loop amplifier comprising two gain stages 1 and 2 separated by a variable optical attenuator (VOA) 3 and a mid-stage loss 4 incorporating dispersion compensation, etc. The VOA 3 is used for setting the overall gain and gain tilt of the amplifier, as well as for compensating changes in the mid-stage loss 4. The mid-stage loss 4 may also be used for add/drop wavelength channel multiplexing. Each of the gain stages 1 and 2 comprises an EDF loop and a pump laser diode under the control of an electronic control circuit (not shown). If required more than one laser diode may be provided for pumping the EDF loops, and/or one or more additional loops and associated pump laser diodes may be provided. Generally the gain stages are controlled in response to receipt by the electronic control circuit of electrical detection signals from photodiodes 5, 6, 7, 8 and 9 for detecting the optical signal by way of associated tap-off couplers and for providing electrical signals indicative of the optical power at (A) the input to the first gain stage 1, (B) the output of the first gain stage 1, (C) the output of the VOA 3, (D) the input of the second gain stage 2, (E) the output of the second gain stage 2.

The control circuit makes use of an algorithm to set the gain loops and set points of the gain stages 1 and 2 in dependence on the detected input power values and the required output power values for the pump stages. The algorithm is based on the gain control mode to enable the ASE compensation to be calibrated in the gain control mode. Furthermore the algorithm takes account of the ASE from the first gain stage fed forward into the second gain stage by the setting of the ASE set point for the second gain stage.

Figure 2:
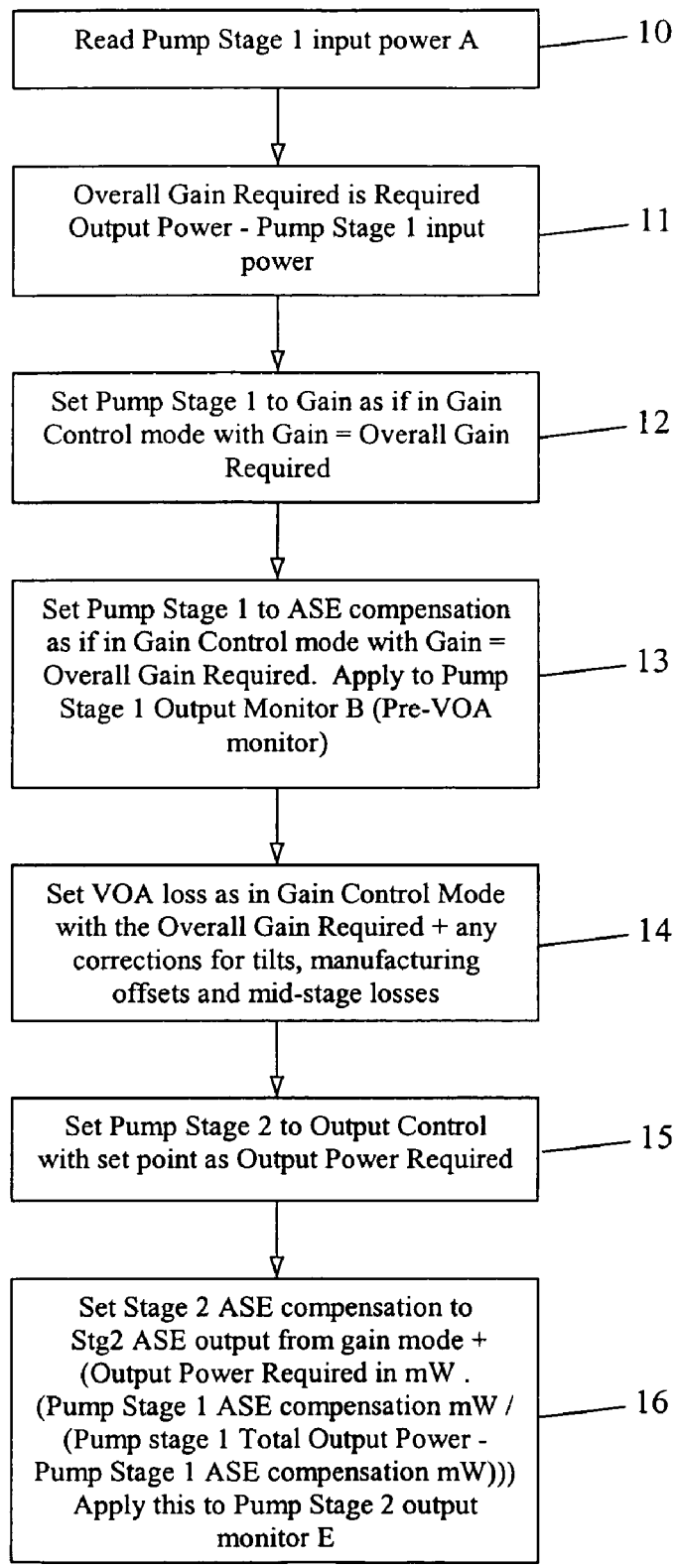
FIG. 2 is a flow diagram illustrating the manner in which such an amplifier is controlled.

This algorithm comprises the following steps as illustrated in the flow diagram of FIG. 2:

(i) The detection signal at A indicative of the input signal to gain stage 1 is read at 10.

(ii) The required overall gain of the amplifier at 11 is the required output signal less the input signal indicated at A. Accordingly the gain of the first gain stage 1 is set in the gain control mode at 12 as a function of the required overall gain by the supply of an appropriate control signal to the gain stage 1 by the control circuit.

(iii) The first stage ASE hardware compensation is then set as a function of the overall gain and tilt required at 13, this value being determined during the calibration process in the gain control mode.

(iv) The control circuit controls the pump stage so as to zero in on the error signal of the general form:

(Total Power at $E$–Stage 2 $ASE$)–($D$+Stage 2 Gain)

which is more properly expressed as:

10*log(Total Power at $B$ in mW–Stage 1 $ASE$ in mW)–(Input power at $A$ in dBm+Stage 1 Gain in dB)

(v) The VOA 3 is set at 14 as a function of overall gain plus any corrections for tilts, manufacturing offsets and mid-stage losses. C has a firmware ASE correction applied to it to match the hardware ASE compensation on B. Under steady state conditions the VOA 3 is kept at constant attenuation, and, to this effect, the input and the output powers of the VOA 3 at B and C must be measured. Accordingly the outputs at B and C are used as the inputs of a control scheme that sets the voltage applied to the VOA and hence its attenuation. In the preferred embodiment the input power is measured at B but this also receives a hardware applied correction for the stage 1 ASE, whereas the output power of the VOA is measured at C with no offsets applied. The control of the VOA voltage is done in firmware. When the attenuation of the VOA is calculated in the firmware control scheme it is done by comparing the signals from B and C. The amount of ASE correction at B must be accounted for in the comparison of the signals at B and C. This can be expressed in the equations:

Current VOA attenuation=(Power measured by Pin $B$ in dBm)–(Power measured by Pin $C$ in dBm)

where Power measured by Pin B in dBm=10*log(Signal from Pin B in mW+stage 1 ASE correction in mW).

(vi) In the gain control mode the gain control is controlled by means of a control signal supplied by the control circuit to the second gain stage 2 at 15 as a function of the required overall gain and any required corrections for tilts and manufacturing offsets.

(vii) The Stage 2 ASE hardware compensation is established at 16 on calibration as a function of the overall required gain and tilt with the control attempting to zero in on the error signal of the general form:

(Total Power at $E$–Stage 2 $ASE$)–($D$+Stage 2 Gain)

which is more properly expressed as:

10*log(Total Power at $E$ in mW–Stage 2 $ASE$ in mW)–(Input power at $D$ in dBm+Stage 2 Gain in dB)

Having set up the required ASE compensation in the gain control mode in an initial calibration step, the amplifier may subsequently be operated in the output power control mode without the need for recalibration. In this case the overall gain required is the required output power of the amplifier less the input power indicated by the detection signal at the A which is read continuously by firmware.

(i) In this control mode the gain of the first gain stage 1 is set as in the gain control mode as a function of the overall gain required.

(ii) Furthermore the stage 1 ASE hardware compensation is set as in the gain control mode as a function of the overall gain and tilt required, this not requiring any further calibration.

(iii) The controller gain is such as to zero in on the error signal:

10*log(Total Power at $B$ in mW−Stage 1 *ASE* in mW)−(Input power at $A$ in dBm+Stage 1 Gain in dB)

(iv) The VOA 3 is set as in the gain control mode as a function of the overall gain required plus any corrections for tilts, manufacturing offsets and mid-stage losses.

(v) However, in the power control mode the hardware of the second gain stage 2 is controlled according to the required output power. The hardware set point is set to the required output power.

(vi) The Stage 2 ASE compensation is set as a function of the Stage 2 ASE in the gain control mode plus the ASE fed forward from stage 1, the ASE fed forward from stage 1 being calculated by looking at the proportion of ASE present at B, applying that proportion to the reading at D and then multiplying up by the gain in stage 2. This may be expressed as follows:

Stg2_ASE_Comp_value=(Stg2_Total_input_mW.10 (Stg2Gain/10). Stg1_ASE_pre_VOA_mW/ Stg1_Tot_pre_VOA_mW)+ Stg2_ASE_output_from_gain_mode where Stg2_ASE_Comp_value is the ASE compensation value in mW to be set in stage 2 output power control mode with ASE compensation.

Stg2_Total_input_mW is read from the input to stage 2 in mW

Stg2Gain is the gain in dB that would be set in stage 2 if the unit was in gain control mode calculated from a gain that is:

Required signal output power (dB)−Read stage 1 input power (dB)

Stg1_ASE_pre_VOA_mW is the ASE correction in mW prior to the VOA

Stg1_Tot_pre_VOA_mW is the total power in mW prior to the VOA

Stg2_ASE_output_from_gain_mode is the ASE setting in mW that would have been set if the device had been in gain control mode for the gain:

Required signal output power (dB)−Read stage 1 input power (dB)

A simpler and equivalent implementation is to set the Stage 2 ASE compensation as a function of the Stage 1 ASE compensation in gain control mode plus the required stage 2 output multiplied by the Stage 1 ASE correction at B divided by the stage 1 signal power at B, that is:

Stg2_ASE_Comp_value= (Stg2_ASE_output_from_gain_mode)+(required stage 2 signal output power in mW). (Stg1_ASE_pre_VOA_mW/ (Stg1_Tot_pre_VOA_mW− Stg1_ASE_pre_VOA_mW))

The ASE compensation values and stage 1 gain values are constantly updated to reflect changes in the input power to stage 1 of the amplifier.

A similar compensation procedure may be applied to the general case of an N stage amplifier in which case the stage N ASE is set to the ASE from stage N in the gain control mode plus the ASE fed forward from stage 1 to (N−1). The ASE fed forward from stage 1 to (N−1) is calculated by working out the proportion of ASE present at the B in stage (N−1), applying that proportion to the reading at the D and then multiplying by the gain in stage N, which may be expressed as follows:

StgN_ASE_Comp_value=(StgN_Total_input_mW.10 (StgNGain/10).Stg(N−1)_ASE_pre_VOA_mW_Stg (N−1)/Stg(N−1)Tot_pre_VOA_mW_Stg(N−1))+ Stg2_ASE_output_from_gain_mode The error signal that the hardware is trying to zero is:

10*log(Total Power at E in mW−Stage N ASE in mW−Stage (N−1) ASE fed forward in mW)−Output power required in dBm)

It should be noted that, for the general case, E denotes the output pin of stage N.

The advantage of this procedure is that the signal output power and the signal gain can be read directly from the outputs B and E of the two stages, and this makes it straightforward to trigger any alarms that may be required to indicate when these parameters move outside of the permitted ranges. In this case the alarms trigger off the signal power of the amplifier and need to trigger in a short timescale after the signal output power goes outside of the permitted range. The fastest way to detect the signal power in output power mode is to have the signal power directly measured by the output photodiode 9. This requires that all of the ASE compensation is loaded onto the ASE correction at the output of the second gain stage 2, rather than mirroring the gain control scheme where only the ASE arising in the second gain stage 2 is directly compensated at the output of the second gain stage 2 and the fed forward ASE is incorporated into the output power setpoint. In output power mode other ways of allotting the ASE arising in the second gain stage 2 between the ASE compensation circuit and the set point of the amplifier require logarithmic and exponential calculations to be performed by the microprocessor which are time consuming to perform.

Another advantage of this way of operating is that, during an input power transient event, the gain setpoints and ASE compensation must be recalculated, and, since the output power setpoint does not need to be recalculated when in the output power mode, any error in the signal output power is limited to the error in the ASE compensation while it is being recalculated. If the change in the input power after the transient is small then this error will be small.

Figure 3:
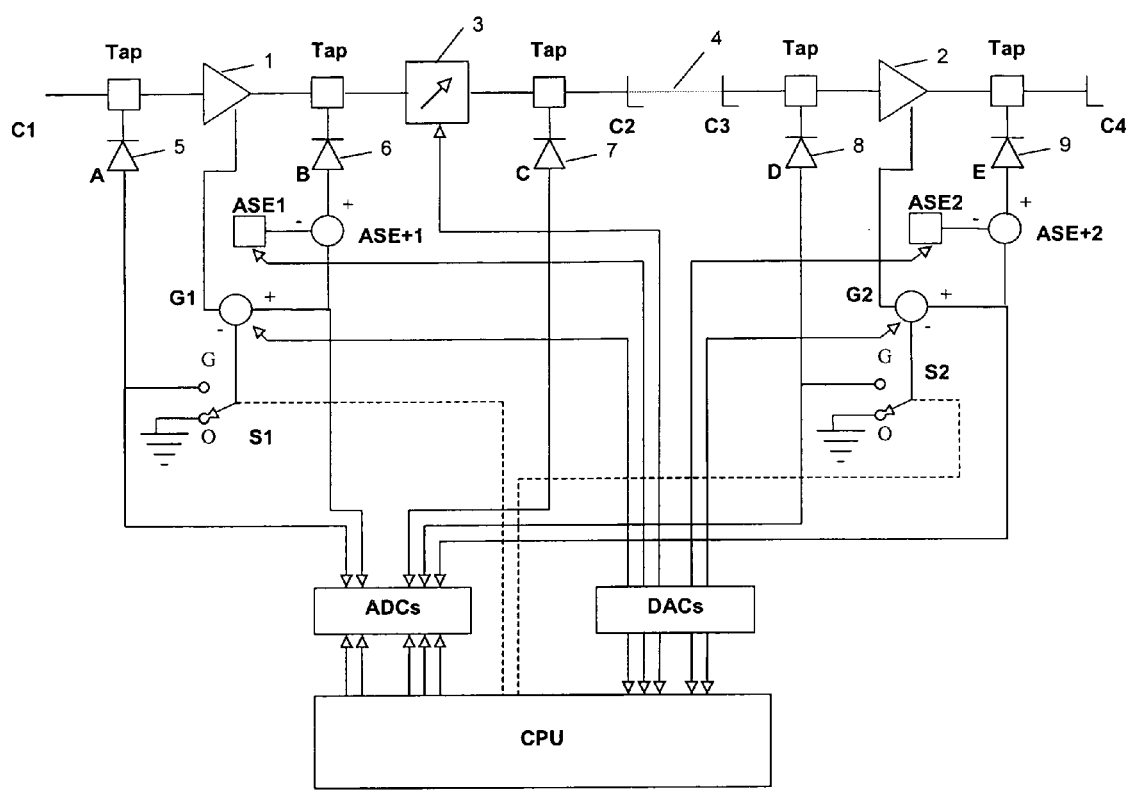
FIG. 3 is circuit diagram of such an amplifier.

FIG. 3 shows the circuit diagram of the amplifier in more detail. In this figure C1, C2, C3 and C4 denote the stage 1 input optical connector, a stage 1 output optical connector, a stage 2 input optical connector and a stage 2 output optical connector. Furthermore ASE1 denotes the stage 1 ASE correction signal, ASE+1 denotes the stage 1 ASE correction subtraction circuit, ASE2 denotes the stage 2 ASE correction signal, and ASE+2 denotes the stage 2 ASE correction subtraction circuit. In addition G1 denotes the stage 1 gain/output power control circuit, and G2 denotes the stage 2 gain/output power control circuit. S1 and S2 are switches for switching between the output control mode and gain control mode for stages 1 and 2 respectively. CPU denotes the microprocessor unit, and ADCs analogue-to-digital converters, whereas DACs are digital-to-analogue converters.

In a modification of the above circuit the components G1 and G2 are replaced by digital signal processors (DSPs).

The invention claimed is:

1. An optical amplifier having a plurality of controllable gain stages separated by loss means and including first and last gain stages, the amplifier comprising:
   (i) gain control means for controlling the drive current supplied to the first gain stage in dependence on the optical input signal to the first gain stage,
   (ii) power control means for controlling the drive current supplied to the last gain stage to maintain the output power of the last gain stage substantially constant, and
   (iii) compensating means for compensating the gain control means and the power control means for the effect of amplified spontaneous emission (ASE) in the first and last gain stages, the compensating means applying a correction factor based on the ASE outputted by the first gain stage, the output power of the first gain stage, the ASE originating in the last gain stage and the output power of the last gain stage.

2. An optical amplifier according to claim 1, wherein the gain control means includes first input detection means for detecting an optical input signal to the first gain stage.

3. An optical amplifier according to claim 1, wherein the gain control means includes first output detection means for detecting an optical output signal from the first gain stage.

4. An optical amplifier according to claim 1, wherein the power control means includes second input detection means for detecting an optical input signal to the last gain stage.

5. An optical amplifier according to claim 1, wherein the power control means includes second output detection means for detecting an optical output signal from the last gain stage.

6. An optical amplifier according to claim 2, wherein the or each detection means incorporates a tap-off coupler for tapping off a proportion of the optical signal.

7. An optical amplifier according to claim 2, wherein the or each detection means incorporates a photodetector for supplying an electrical detection signal indicative of a detected optical signal.

8. An optical amplifier according to claim 1, wherein variable attenuation means are provided for setting the required overall gain.

9. An optical amplifier according to claim 1, wherein the loss means incorporates dispersion compensation.

10. An optical amplifier according to claim 1, wherein the gain stages comprise loops of an erbium-doped fibre.

11. An optical amplifier according to claim 1, wherein the gain stages incorporate pump laser diodes.

12. An optical amplifier according to claim 1, wherein the gain control means is arranged to control the drive current supplied to the first gain stage so as to zero in on an error signal of the general form:

(Total Power at $B$–Stage 1 $ASE$)–($A$+Stage 1 Gain)

where Total Power at B is a signal representing the output power of the first gain stage,
   Stage 1 ASE is a signal representing the ASE outputted by the first gain stage determined during a calibration step in a gain control mode,
   A is a signal representing the input signal of the first gain stage, and
   Stage 1 Gain is a signal representing the gain of the first gain stage.

13. An optical amplifier according to claim 1, wherein the power control means is arranged to control the drive current supplied to the last gain stage so as to zero in on an error signal of the general form:

(Total Power at $E$–Stage 2 $ASE$)–($D$+Stage 2 Gain)

where Total Power at E is a signal representing the output power of the last gain stage,
   Stage 2 ASE is a signal representing the ASE outputted by the last gain stage, corresponding to:
   (ASE arising in last gain stage)+(required last gain stage signal output power).(Stage 1 ASE)/(first gain stage signal output power),
   D is a signal representing the input signal of the last gain stage, and
   Stage 2 Gain is a signal representing the gain of the last gain stage,
   the ASE arising in the last gain stage being found by calibration in a gain control mode.

14. A method of controlling an optical amplifier having a plurality of gain stages in order to compensate for the effect of amplified spontaneous emission (ASE), the method comprising:
   (i) detecting an optical input signal to a first gain stage,
   (ii) detecting an optical output signal from the first gain stage,
   (iii) controlling the drive current supplied to the first gain stage in dependence on the optical input signal to the first gain stage,
   (iv) detecting an optical input signal to a last gain stage,
   (v) detecting an optical output signal from the last gain stage,
   (vi) controlling the drive current supplied to the last gain stage to maintain the output power of the last gain stage substantially constant, and
   (vii) compensating for the effect of amplified spontaneous emission (ASE) in the first and last gain stages by applying a correction factor based on the ASE outputted by the first gain stage, the output power of the first gain stage, the ASE originating in the last gain stage and the output power of the last gain stage.

15. A method according to claim 14, wherein a calibration step is performed in which the correction factor is calibrated in the gain control mode of the amplifier, the correction factor subsequently being applied in a power control mode of the amplifier, the ASE for each gain stage in the gain control mode representing the ASE originating in that stage.

16. A method according to claim 14, wherein the drive current supplied to the first gain stage is controlled so as to zero in on an error signal of the general form:

(Total Power at $B$–Stage 1 $ASE$)–($A$+Stage 1 Gain)

where Total Power at B is a signal representing the output power of the first gain stage,
   Stage 1 ASE is a signal representing the ASE outputted by the first gain stage determined during a calibration step in a gain control mode,
   A is a signal representing the input signal of the first gain stage, and
   Stage 1 Gain is a signal representing the gain of the first gain stage.

17. A method according to claim 14, wherein the drive current supplied to the last gain stage is controlled so as to zero in on an error signal of the general form:

(Total Power at $E$–Stage 2 $ASE$)–(Required signal output power)

where Total Power at E is a signal representing the output power of the last gain stage, Stage 2 ASE is a signal representing the ASE outputted by the last gain stage corresponding to:

(ASE arising in the last gain stage)+(required last gain stage signal output power).(Stage 1 ASE)/(first gain stage signal output power).

18. An optical amplifier according to claim 3, wherein the or each detection means incorporates a tap-off coupler for tapping off a proportion of the optical signal.

19. An optical amplifier according to claim 3, wherein the or each detection means incorporates a photodetector for supplying an electrical detection signal indicative of a detected optical signal.

20. An optical amplifier having a plurality of controllable gain stages separated by loss means and including first and last gain stages, the amplifier comprising:

(i) gain control means for controlling the drive current supplied to the first gain stage in dependence on the optical input signal to the first gain stage, (ii) power control means for controlling the drive current supplied to the last gain stage to maintain the output power of the last gain stage substantially constant, and (iii) compensating means for compensating the gain control means for the effect of amplified spontaneous emission (ASE) in the first gain stage, the compensating means applying a correction factor based on the ASE outputted by the first gain stage and the output power of the first gain stage, wherein the gain control means is arranged to control the drive current supplied to the first gain stage so as to zero in on an error signal of the general form:

(Total Power at $B$–Stage 1 $ASE$)–($A$+Stage 1 Gain)

where Total Power at B is a signal representing the power of the output signal from the first gain stage, Stage 1 ASE is a signal representing the ASE outputted by the first gain stage determined during a calibration step in a gain control mode, A is a signal representing the input signal of the first gain stage, and Stage 1 Gain is a signal representing the gain of the first gain stage.

21. An optical amplifier having a plurality of controllable gain stages separated by loss means and including first and last gain stages, the amplifier comprising:

(i) gain control means for controlling the drive current supplied to the first gain stage in dependence on the optical input signal to the first gain stage, (ii) power control means for controlling the drive current supplied to the last gain stage to maintain the output power of the last gain stage substantially constant, and (iii) compensating means for compensating the gain control means for the effect of amplified spontaneous emission (ASE) in the first gain stage, the compensating means applying a correction factor based on the ASE outputted by the first gain stage and the output power of the first gain stage, wherein the power control means is arranged to control the drive current supplied to the last gain stage so as to zero in on an error signal of the general form:

(Total Power at $E$–Stage 2 $ASE$)–($D$+Stage 2 Gain)

where Total Power at E is a signal representing the power of the output signal from the last gain stage, Stage 2 ASE is a signal representing the ASE outputted by the last gain stage, D is a signal representing the input signal of the last gain stage, and Stage 2 Gain is a signal representing the gain of the last gain stage.

22. A method of controlling an optical amplifier having a plurality of gain stages in order to compensate for the effect of amplified spontaneous emission (ASE), the method comprising:

(i) detecting an optical input signal to a first gain stage, (ii) detecting an optical output signal from the first gain stage, (iii) controlling the drive current supplied to the first gain stage in dependence on the optical input signal to the first gain stage, (iv) detecting an optical input signal to a last gain stage, (v) detecting an optical output signal from the last gain stage, (vi) controlling the drive current supplied to the last gain stage to maintain the output power of the last gain stage substantially constant, and (vii) compensating for the effect of amplified spontaneous emission (ASE) in the first gain stage by applying a correction factor based on the ASE of the first gain stage and the output power of the first gain stage, wherein a calibration step is performed in which the correction factor is calibrated in the gain control mode of the amplifier, the correction factor subsequently being applied in a power control mode of the amplifier.

23. A method of controlling an optical amplifier having a plurality of gain stages in order to compensate for the effect of amplified spontaneous emission (ASE), the method comprising;

(i) detecting an optical input signal to a first gain stage, (ii) detecting an optical output signal from the first gain stage, (iii) controlling the drive current supplied to the first gain stage in dependence on the optical input signal to the first gain stage, (iv) detecting an optical input signal to a last gain stage, (v) detecting an optical output signal from the last gain stage, (vi) controlling the drive current supplied to the last gain stage to maintain the output power of the last gain stage substantially constant, and (vii) compensating for the effect of amplified spontaneous emission (ASE) in the first gain stage by applying a correction factor based on the ASE of the first gain stage and the output power of the first gain stage, wherein the drive current supplied to the first gain stage is controlled so as to zero in on an error signal of the general form:

(Total Power at $B$–Stage 1 $ASE$)–($A$+Stage 1 Gain)

where Total Power at B is a signal representing the power of the output signal from the first gain stage, Stage 1 ASE is a signal representing the ASE outputted by the first gain stage, A is a signal representing the input signal of the first gain stage, and Stage 1 Gain is a signal representing the gain of the first gain stage.

24. A method of controlling an optical amplifier having a plurality of gain stages in order to compensate for the effect of amplified spontaneous emission (ASE), the method comprising:

(i) detecting an optical input signal to a first gain stage,
(ii) detecting an optical output signal from the first gain stage,
(iii) controlling the drive current supplied to the first gain stage in dependence on the optical input signal to the first gain stage,
(iv) detecting an optical input signal to a last gain stage,
(v) detecting an optical output signal from the last gain stage,
(vi) controlling the drive current supplied to the last gain stage to maintain the output power of the last gain stage substantially constant, and
(vii) compensating for the effect of amplified spontaneous emission (ASE) in the first gain stage by applying a correction factor based on the ASE of the first gain stage and the output power of the first gain stage, wherein the drive current supplied to the last gain stage is controlled so as to zero in on an error signal of the general form:

$$(\text{Total Power at } E - \text{Stage 2 } ASE) - (\text{Required signal output power})$$

where Total Power at E is a signal representing the power of the output signal from the last gain stage, Stage 2 ASE is a signal representing the ASE outputted by the last gain stage determined during a calibration step in a gain control mode.

* * * * *